US006779057B2

(12) United States Patent
Masters et al.

(10) Patent No.: US 6,779,057 B2
(45) Date of Patent: Aug. 17, 2004

(54) METHOD, SYSTEM, AND PROGRAM FOR INDICATING DATA TRANSMITTED TO AN INPUT/OUTPUT DEVICE AS COMMITTED

(75) Inventors: Steven K. Masters, San Jose, CA (US); Michael C. Timpanaro-Perrotta, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 09/838,631

(22) Filed: Apr. 18, 2001

(65) Prior Publication Data

US 2002/0156946 A1 Oct. 24, 2002

(51) Int. Cl.[7] .............................................. G06F 3/00
(52) U.S. Cl. .............................. 710/55; 710/56; 710/52
(58) Field of Search ..................... 711/117–146; 710/52, 710/55, 57, 106, 33, 5, 15, 19, 17, 53, 54, 56

(56) References Cited

U.S. PATENT DOCUMENTS

| 4,435,762 | A |   | 3/1984  | Milligan et al. |
|-----------|---|---|---------|-----------------|
| 5,586,264 | A |   | 12/1996 | Belknap et al.  |
| 5,608,875 | A |   | 3/1997  | Mori            |
| 5,664,189 | A |   | 9/1997  | Wilcox et al.   |
| 5,671,389 | A | * | 9/1997  | Saliba ........................... 710/68 |
| 5,892,633 | A | * | 4/1999  | Ayres et al. ................... 360/39 |
| 5,944,804 | A | * | 8/1999  | Aditya et al. ................ 710/106 |
| 6,272,568 | B1 | * | 8/2001 | Ishihara ........................ 710/68 |

OTHER PUBLICATIONS

Cassie, J.V. et al., "Recovery From 'Machine Check' In Buffered Tape System", IBM Technical Disclosure Bulletin vol. 20, No. 6, Nov. 1977, pp. 2409–2410.
Peterson, David A., "Information Technology—SCSI Stream Commands—2 (SSC–2)", (Working Draft) T10 Project 1434–D, Revision 00, Aug. 7, 2000, pp. i–100.

* cited by examiner

Primary Examiner—Jeffrey Gaffin
Assistant Examiner—Joshua D Schneider
(74) Attorney, Agent, or Firm—David W. Victor; Konrad Raynes & Victor LLP

(57) ABSTRACT

Provided is a method, system, and program for maintaining status information on data transmitted to an output device. Data is transmitted to an Input/Output (I/O) device. The I/O device stores the transmitted data in a computer readable medium memory. A determination is made as to whether a fixed amount of data exceeding a threshold was transmitted. An indication is made that transmitted data equivalent to the fixed amount was successfully outputted from the computer readable medium after determining that the fixed amount of data exceeding the threshold was transmitted.

48 Claims, 5 Drawing Sheets

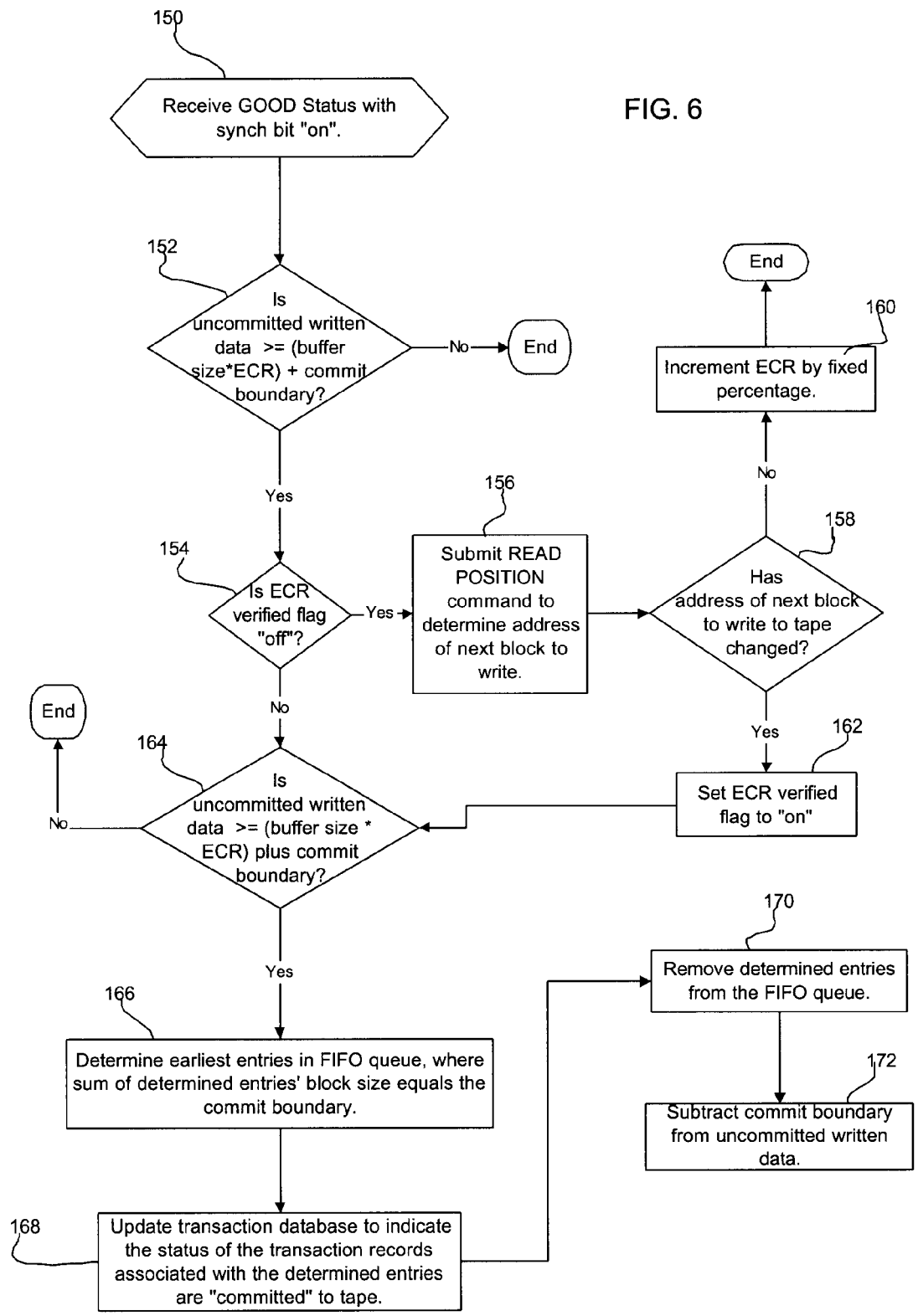

METHOD, SYSTEM, AND PROGRAM FOR INDICATING DATA TRANSMITTED TO AN INPUT/OUTPUT DEVICE AS COMMITTED

BACKGROUND OF THE INVENTION

1. Field of the Invention

The present invention relates to method, system, and program for indicating data transmitted to an input/output device as committed.

2. Description of the Related Art

A storage manager software product, such as the International Business Machines Corporation ("IBM®") Tivoli Storage Manager,** manages the backup and archiving of client application data at a central server. The storage manager keeps track of the status of files backed-up on tape or other storage medium. The storage manager will not release a file subject to a backup operation until it is assured that the file has been successfully written to tape. A tape drive buffers data in a tape drive cache. When the tape cache is filled, the tape drive controller writes the data from the tape drive cache to the tape medium on a first-in-first-out (FIFO) basis. In the Small Computer System Interface (SCSI) protocol for tape devices, the tape drive returns a complete or GOOD status message when the data is buffered in cache and before the buffered data is written to tape. The storage manager will issue a SCSI WRITE FILEMARKS command with a length of zero to cause the tape drive to write all buffered data to tape. The tape drive returns a GOOD status when all the buffered data is written to tape.

**TIVOLI is a registered trademark of Tivoli Systems, Inc. IBM is a registered trademark of International Business Machines Corporation.

Upon receiving this GOOD status in response to the SCSI WRITE FILEMARKs command, the storage manager can be assured that all data previously sent to the tape drive since the last successful WRITE FILEMARKS command is on tape. At this point, the storage manager may release the backup files assured to be on tape. This process ensures data integrity on the tape drive as of the time stamp of the most recently released update. The above described commands for writing data to tape are further described in the publication "SCSI Stream Commands-2 (SSC-2)", T10/1434-D rev. 00, Working Draft, printed Aug. 7, 2000 (Copyright American National Standards Institute), which publication is incorporated herein by reference in its entirety.

There is a continued need in the art for improved techniques for determining the status of transmitted data.

SUMMARY OF THE PREFERRED EMBODIMENTS

Provided is a method, system, and program for maintaining status information on data transmitted to an output device. Data is transmitted to an Input/Output (I/O) device. The I/O device stores the transmitted data in a cache memory. A determination is made as to whether a fixed amount of data exceeding a threshold was transmitted. An indication is made that transmitted data equivalent to the fixed amount was successfully outputted from the cache device after determining that the fixed amount of data exceeding the threshold was transmitted.

Additionally, the threshold may comprise a cache capacity.

In further implementations, the I/O device sends a notification upon successfully outputting data from the cache, and wherein the indication that data was successfully outputted from the cache occurs with respect to data for which notification was not received from the I/O device indicating that the data was successfully outputted.

Still further, the step of indicating that transmitted data equivalent to the fixed amount was successfully outputted comprises determining transmitted data equivalent to the fixed amount that is not indicated as successfully outputted and that was sent before other transmitted data not indicated as successfully outputted. The determined transmitted data is indicated as successfully outputted.

Yet further, the I/O device may compress data before storing the transmitted data in the cache. In such case, determining whether the fixed amount of data exceeding the threshold was transmitted and not indicated as successfully outputted comprises determining whether the fixed amount of data exceeding the threshold times a determined compression ratio was transmitted and not indicated as successfully outputted.

The I/O device may comprise a tape drive. In such case, outputting data comprises transferring data from the cache to a magnetic tape medium.

The described implementations provide a technique for determining whether data was successfully outputted, e.g., written from device cache to the storage medium, without having to interrupt the transfer of data to the I/O device. With the described implementations, determinations of whether data was successfully outputted is based on the amount of data transmitted and accepted by the device.

BRIEF DESCRIPTION OF THE DRAWINGS

Referring now to the drawings in which like reference numbers represent corresponding parts throughout:

FIGS. 5 and 6 illustrate logic for the host to determine which data transmitted to the tape drive to indicate as committed to tape in accordance with implementations where the tape drive compresses data.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
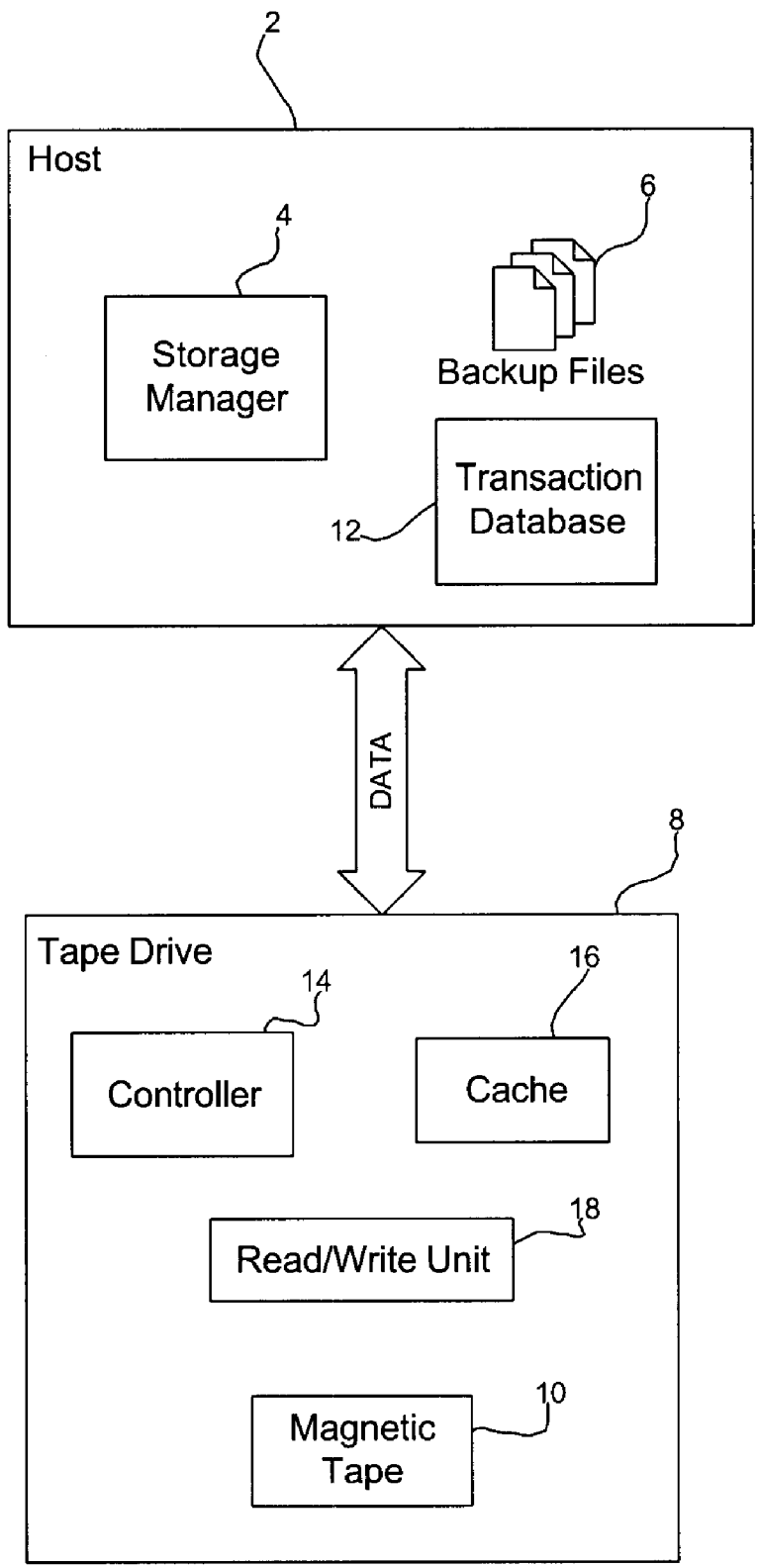
FIG. 1 is a block diagram illustrates a computing environment in which aspects of the invention may be implemented.

FIG. 1 illustrates a host system 2 including a storage manager 4 program that manages backup operations to write backup files 6 generated by application programs to a tape drive 8 to store on magnetic tape 10. The host system 2 may comprise any computer device known in the art, such as a server, mainframe, desktop computer, network client, laptop, hand held computer, telephony device, etc. The storage manager 4 may be part of any program that manages system data, such as the IBM® Tivoli Storage Manager. The storage manager 4 maintains a transaction database 12 that has a record for the status of backup files 6. When the storage manager 4 is assured that a backup file 6 transmitted to the tape driver 8 is stored on the tape, the storage manager 4 may then update the transaction database 12 to indicate that the backup operation is complete and release the backup file on the magnetic tape 10. Once released, data integrity (consistency) is assured as of the time stamp of the most recently released update. Moreover, a clean-up operation can reuse the storage block used by the released backup file for new data.

The tape drive 8 includes a controller 14, cache 16, a read/write unit 18, which includes the magnetic tape heads (not shown), and a magnetic tape medium 10. The controller 14 buffers data received from the host 2 in the cache 16. When the cache 16 is filled, the controller 14 starts writing the cached data on a FIFO basis to the magnetic tape 10. The host 2 may communicate with the tape drive 8 via any communication interface known in the art, e.g., serial, parallel, network, etc. Alternatively, the tape drive 8 may be installed within an Input/Output (I/O) bay of the host 2, or connected through an interface connection known in the art, e.g., serial, parallel, etc.

In certain implementations, if additional data is received from the host 2 when the cache 16 is full, the controller 14 destages the oldest data in the cache 16 to the magnetic tape 10 to make room for the new data. Destaging data involves moving the data from one memory o storage device, such as a cache to another storage or memory device. This process where data is continually written from cache 16 to the magnetic tape 10 as new data is received is referred to as "streaming".

Prior art backup techniques that utilize the SCSI WRITE FILEMARKS command to flush the tape cache interfere with the streaming process because the controller 14 must stop streaming data to perform the flush operation. After stopping the streaming operation, the controller 14 then starts flushing the cached data to the magnetic tape. With tape cache buffer sizes of 8 to 64 megabytes (MB), a flush operation can take several seconds to complete, and with error processing several minutes. During this time, the storage manager 4 would not be able to transfer any further data to the tape drive. After completing the flush or WRITE FILEMARKS operation, the host 2 is assured that all the data sent to the tape drive 8 has been committed to magnetic tape 10.

Moreover, in the prior art, streaming does not resume until after the flush operation completes and the entire cache is filled again. In this prior art, the tape drive cannot resume streaming data until the entire cache is filled and further subsequent data is received. Moreover, after the flush operation, the tape head must be repositioned to the required location to resume data streaming.

Prior art backup techniques that utilize the flush operation, such as those implemented using the WRITE FILEMARKS command, interfere with the streaming of data. Data transfer operations are optimized during "streaming" because data is being continually transferred from the tape cache to the tape and writes are not interrupted. For this reason, the prior art backup techniques that utilize the flush operation interrupt optimal streaming mode.

For the above reasons, there is a need in the art for a technique that allows the storage manager to confirm that backup data has been committed to tape without interfering with the streaming of data to tape.

Figure 2:
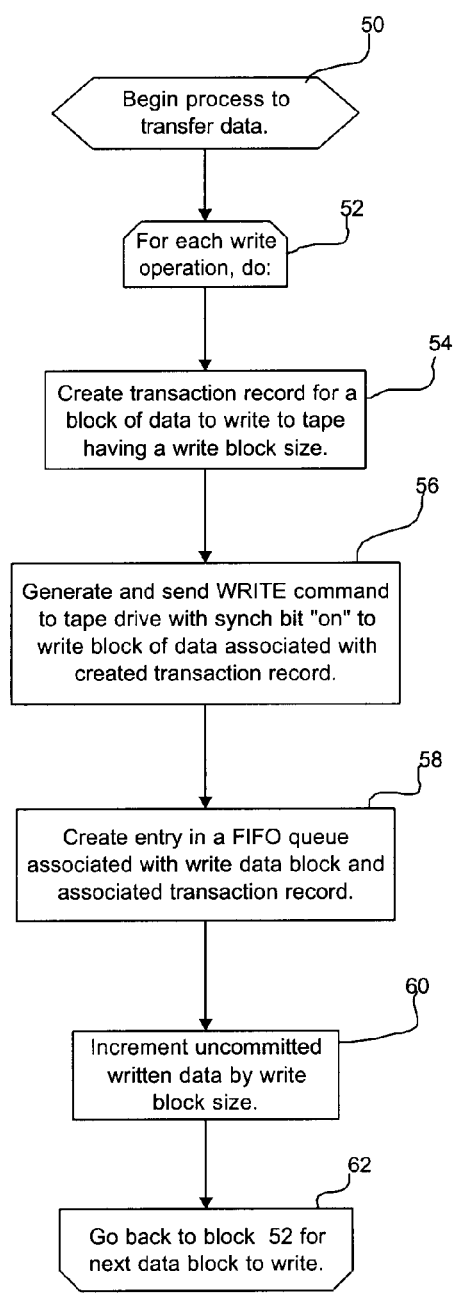
FIG. 2 illustrates logic implemented in a host system to transfer data to a tape drive in accordance with implementations of the invention.

FIG. 2 illustrates logic implemented in the storage manager 4 to submit WRITE commands to backup data files. In the described implementations, the host 2 sends write data to the tape drive 8 in blocks of a fixed size, referred to herein as a write block size. In alternative implementations, the host 2 may send data in variable size blocks. The process to transfer data begins at block 50. The data transfer may comprise a backup operation to backup files for an application program or client computer, or any other operation to transfer data to the tape drive 8. To implement the data transfer, e.g., backup operation, the storage manager 4 performs a loop from blocks 52 to 62 to transfer the data in blocks having the same write block size. For each data block to transfer, the storage manager 4 generates (at block 54) a transaction record in the transaction database 12 for the data block. The storage manager 4 then generates and sends (at block 56) a WRITE command to write the data block associated with the transaction record to the tape drive 8. In certain implementations, the WRITE command has a special synchronization or "synch" bit set "on" to alter how the tape drive 8 responds to the WRITE command in accordance with the described implementations. The WRITE command may comprise a SCSI WRITE command as described in the "SCSI Stream Commands-2 (SSC-2)" publication, incorporated by reference above. In such case, one of the operation codes may be dedicated to the "synch" bit. Both the storage manager 4 and tape controller 14 would be programmed to understand this "synch" bit according to the described implementations.

When generating the WRITE command, the storage manager 4 would also add (at block 58) an entry to a FIFO queue of transmitted write commands. This entry in the FIFO queue identifies the transmitted write command and the transaction record in the transaction database 12 providing information for the data block transferred. The storage manager 4 maintains the FIFO queue for all write data transferred to the tape drive 8. This FIFO queue is used to determine data previously sent to the tape drive 8 that is committed to magnetic tape 10. A variable referred to as "uncommitted written data" is incremented (at block 60) by the number of bytes in the write block size to count the total number of bytes transferred to the tape drive 8 that have not yet been confirmed as committed to tape 10. At block 62, control proceeds back to block 52 to generate the next write command to transfer the next data block to the tape drive 8. With the logic of FIG. 2, the storage manager 4 would continue to generate and send WRITEs without receiving a return "GOOD" or complete status from the tape drive. However, the storage manager 4 may cease transferring WRITE commands upon receiving an error message from the tape drive 8 in order to resend data indicated as not yet committed.

Figure 3:
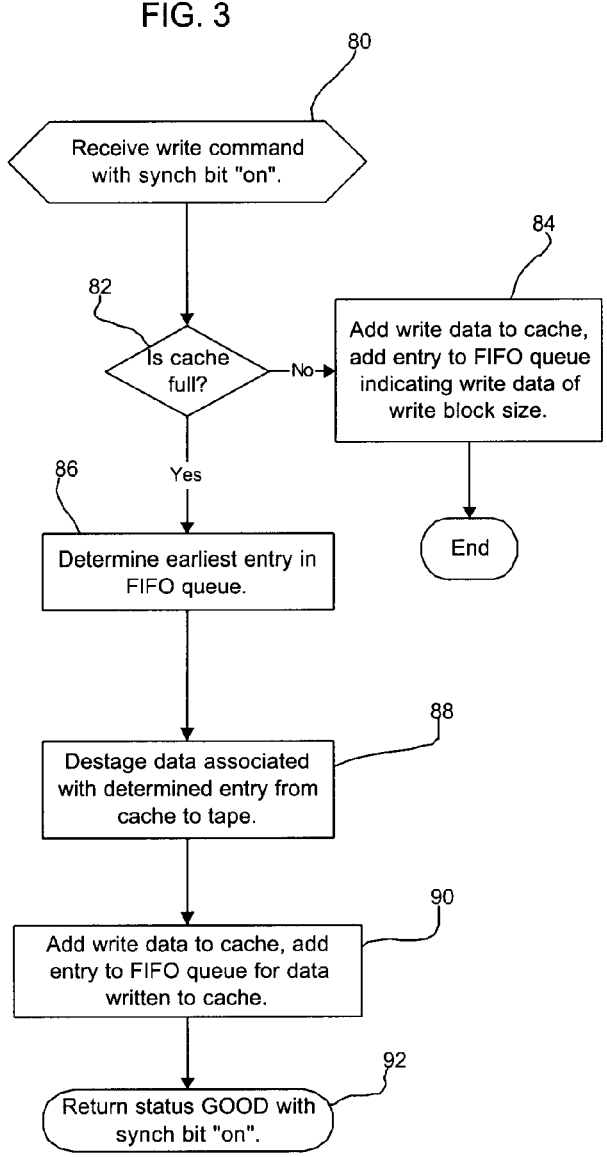
FIG. 3 illustrates logic implemented in the tape drive system to process write requests in accordance with implementations of the invention.

FIG. 3 illustrates logic implemented in the tape controller 14 to handle a WRITE command including the "synch" bit. At block 80, the controller 14 receives the WRITE command from the host 2 with the "synch" bit "on". In response, the controller 14 determines whether the cache 16 is full. If not, the controller 14 writes (at block 84) the block of write data to cache 16 and adds an entry to a FIFO queue ordering the data in the cache 16. The controller 14 uses this FIFO queue to select, on a FIFO basis, data to destage from cache 16. If (at block 82) the cache 16 is full, then the controller 14 determines (at block 86) the earliest entry, i.e., First-in, in the FIFO queue. The controller 14 then destages (at block 88) the data associated with the determined entry in the FIFO queue from the cache 16 to the magnetic tape 10. The data provided with the WRITE command received at block 80 is written (at block 90) to cache 16 and an entry for the data written to cache 16 is added to the end of the FIFO queue. The controller 14 then returns (at block 92) a GOOD status to the host 2 with the "synch" bit "on".

Figure 4:
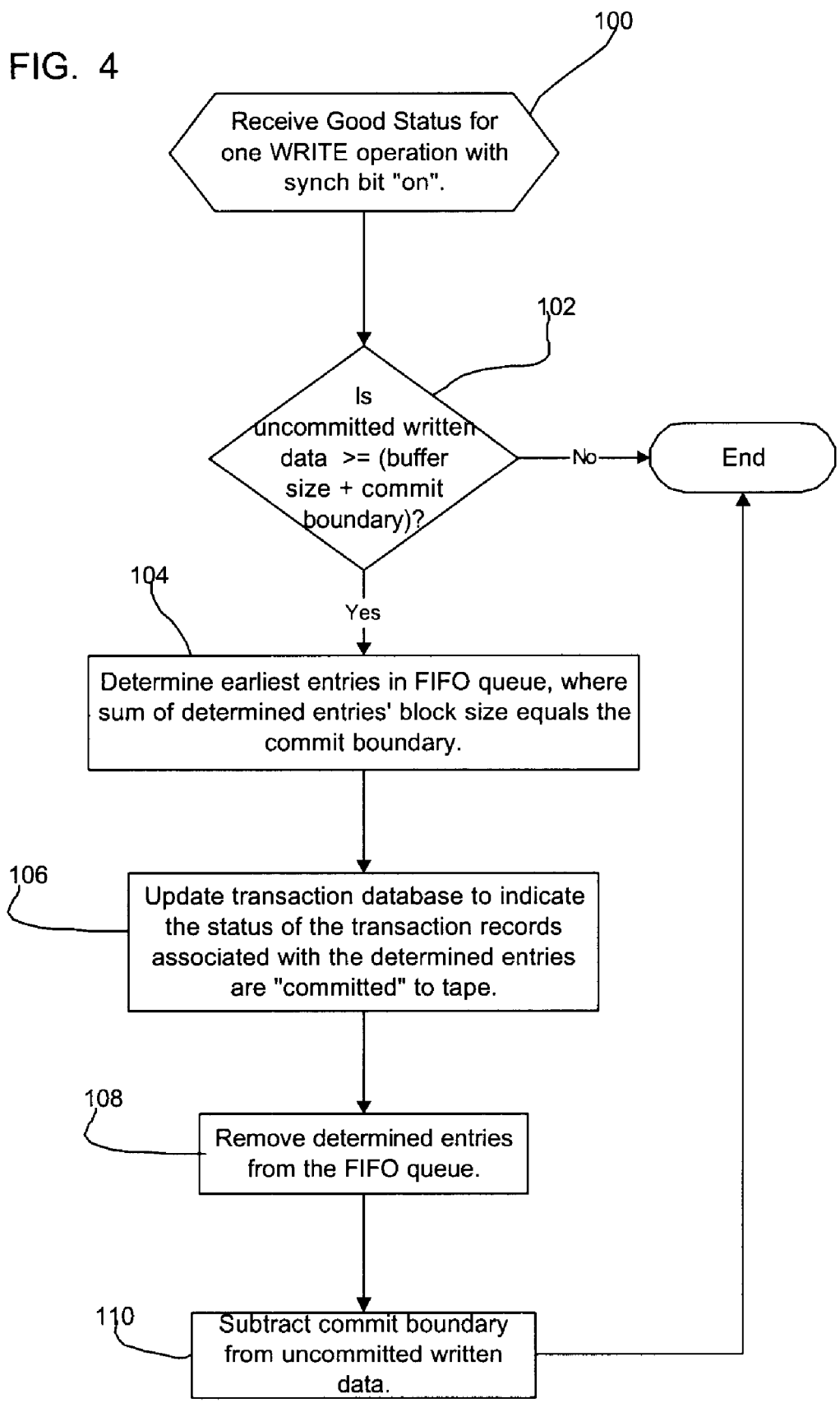
FIG. 4 illustrates logic for the host to determine which data transmitted to the tape drive to indicate as committed to tape in accordance with implementations of the invention.

FIG. 4 illustrates logic implemented in the storage manager 4 to process the GOOD status with the "synch" bit "on" received (at block 100) from the tape drive 8. Such GOOD status indicates that the earliest write data in the tape drive, i.e., at the first-in end of the tape drive 8 and host 2 FIFO queues, was committed to tape. Thus, in the described implementations, a returned GOOD status indicates that data sent with a WRITE command submitted several WRITE commands ago was committed because the tape drive 8 writes the oldest data in cache 16 to the tape 10. In response to the GOOD status with the "synch" bit "on", the storage manager 4 determines (at block 102) whether the amount of uncommitted written data is greater than the buffer size, which is the size of the tape cache 16 (FIG. 1), plus a commit boundary. The storage manager 4 may determine the cache 16 buffer size by querying the tape drive 10 for information. The commit boundary is the amount of bytes that are transferred before the storage manager 4 will make a determination as to what written data has been committed to tape 10. The commit boundary may comprise a multiple of the write block size, such that the commitment determination is made after transmitting a series of WRITE operations. If the uncommited written data is less then the cache 16 buffer size plus the commit boundary, then either the tape cache 16 has not been filled or an amount of data equivalent to the commit boundary has not yet been sent after the cache 16 became full. In the described implementations, if the cache 16 is not full, then the tape controller 14 cannot be assured to have started transferring cached write data to the tape 10 as, in the described tape implementations, data is not destaged until the cache 16 is fill. Thus, the storage manager 4 cannot be assured that data has been committed until the tape cache 16 is fill. After the tape cache 16 becomes full, then the storage manager 4 is assured that for every subsequent byte transferred to the tape drive 8, the earliest data in the tape FIFO queue, which mirrors the storage manager 4 FIFO queue, has been committed to tape 10. Thus, if the uncommitted written data equals the tape cache 16 buffer size plus the commit boundary, then the storage manager 4 can be assured that the tape controller 14 has transferred an amount of data from the cache 16 to the tape 10 at least equal to the size of the commit boundary.

If the uncommitted written data is equal or greater than the cache 16 size and the commit boundary, then the storage manager 4 determines (at block 104) the earliest entries in its FIFO queue, such that the block size of the determined entries equals the commit boundary. For instance, if the commit boundary was 32 KB and the write block size was 4 KB, then the eight earliest entries would be determined from the FIFO queue. The storage manager 4 would then update (at block 106) the transaction database 12 to indicate the status of the transaction records representing the determined FIFO entries, which in turn represent data transmitted with a WRITE command, as "committed" to tape 10. The determined entries are removed (at block 108) from the FIFO queue. The commit boundary is subtracted (at block 110) from the uncommitted written data variable. The storage manager 4 indicates that a number of bytes of the earliest data in its FIFO queue equivalent to the commit boundary byte size was committed. The storage manager 4 can indicate that such data was committed to the tape 10 because the storage manager 4 sent the commit boundary amount of data when the cache 16 was full. In order for the tape drive 8 to have accepted the commit boundary amount of data after the cache 16 is full without returning an error, the tape drive 8 would have had to destage from cache 16 to tape 10 an amount of data equivalent to the commit boundary byte size.

In certain implementations, the tape drive 8 may compress data before writing the data to tape 10. For instance, the tape drive 8 may include a compression chip to compress and decompress data it reads and writes from tape. If the tape drive 8 compresses data before writing the data to cache 16, then writing the cache 16 buffer size worth of data to the tape drive 8 will not fill the cache. In such case, the logic of FIG. 4 would have to be modified to have the storage manager 4 transfer additional data to ensure that the cache 16 is filled based on the compression rate of the tape drive 10. Step 102 would have to be modified, such that the determination is whether the uncommitted written data is greater or equal to the buffer size times the tape compression rate plus the commit boundary.

Figure 5:
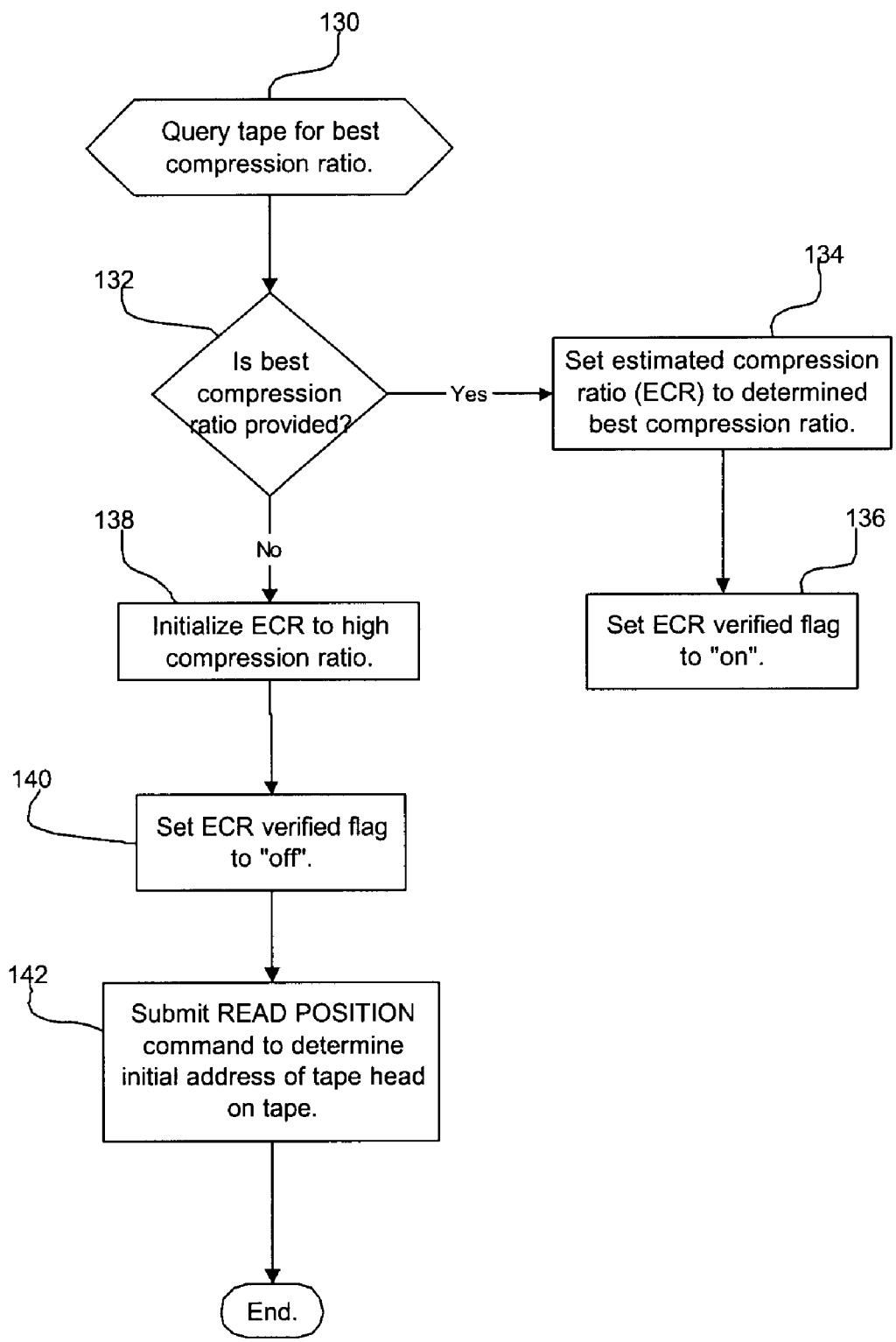

FIGS. 5 and 6 illustrate logic implemented in the storage manager 4 to take into account a compression ratio used by the tape drive 10. If the tape drive 10 does not compress data, then the storage manager would use the logic of FIG. 4 to commit write data. FIG. 5 illustrates an initialization routine the storage manager 4 would perform before sending write requests to set certain variables used when the tape drive 10 compresses data. With respect to FIG. 5, control begins at block 130 with the storage manager 4 querying the tape drive 10 for a best compression ratio. If (at block 132) the tape drive 10 provides a best compression ratio, then the storage manager 4 sets (at block 134) the estimated compression ratio (ECR) variable to the best compression ratio of the tape drive 10 and sets (at block 136) an estimated compression ratio (ECR) verified flag to "on", indicating that the tape drive 10 compression ratio is determined. If (at block 132) the tape drive 10 does not provide information as to its best compression ratio, then the storage manager 4 initializes (at block 138) the estimated compression ratio (ECR) to a particularly high compression rate and sets (at block 140) the estimated compression ratio (ECR) verified flag to "off", indicating that the tape drive 10 compression ratio has not yet been determined. The storage manager 4 further submits (at block 142) a SCSI READ POSITION command to the tape drive 10 to determine an initial address of the next block of data to be written to the tape 10, which would be the "Last Block Location" field returned in response to the READ POSITION command described in the "SCSI Stream Commands-2 (SSC-2)" publication, which publication is incorporated herein by reference above.

FIG. 6 illustrates logic implemented in the storage manager 4 to commit data upon receiving (at block 150) the GOOD status including a "synch" bit that is "on". If (at block 152) the uncommitted written data is greater than or equal to the cache 16 buffer size times the estimated compression ratio (ECR) plus the commit boundary size, then control proceeds to block 154; otherwise, the routine of FIG. 6 ends. If (at block 154) the estimated compression ratio (ECR) verified flag is "off", indicating that a minimum tape drive 10 compression ratio has not been verified, then the storage manager 4 submits (at block 156) a READ POSITION command to the tape drive 10 to determine the current address of the next block to write to the tape 10. If (at block 158) the address of the next block to write has not changed from the initial determined address at block 142 in FIG. 5, then the tape cache 16 has not been filled because the previously determined next block address to write to tape 10 has not been destaged from cache 16. In such case, if the address of the next block has not changed, then the storage manager 4 increments (at block 160) the estimated compression ratio by a certain percentage, e.g., 25%, and the logic of FIG. 6 ends. This incremented ECR is then used in subsequent invocations of the logic of FIG. 5. Otherwise, if the address of the next block in cache 16 to write to tape 10 has changed, then the estimated compression ratio (ECR) flag is set (at block 162) to "on".

If (at block 154) the estimated compression ratio (ECR) verified flag is "on" or the flag is set "on" (at block 162), then the storage manager 4 proceeds to determine (at block 164) whether the uncommitted written data is greater than or equal to the buffer size times the estimated compression ratio plus the commit boundary. If not, control ends. Otherwise, the storage manager 4 proceeds to blocks 166 through 172 to commit data and update transaction records as performed at blocks 104 through 110 in FIG. 4.

In a yet further implementation, the storage manager 4 may set the estimated compression ratio (ECR) to a high rate that would, with an extremely high probability, not be exceeded by the tape drive 10, and use such a high ECR to determine whether to commit data.

The above described implementations provide a technique for a storage manager 4 to use to determine when data sent to a tape drive 8 has been transferred to tape 10 without having to interrupt the streaming of data to the tape drive 8 and flush the tape cache 16 in a manner known in the art. With the described implementations, the storage manager 4 can continue streaming data to the tape drive 8 and use internal calculations based on the tape cache 16 size and a compression ratio used by the tape drive 8 to ascertain transmitted data that must have been destaged from the tape cache 16 to tape 10. Once the storage manager 4 is assured that data was successfully stored on the tape 10, the storage manager 4 may release the committed data to free space at the host 2.

The following describes some alternative implementations.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the host 2 communicated with the tape drive 8 using SCSI commands. In alternative implementations, different data transfer protocols other than SCSI may be used, which would use different messaging and status info than that described herein.

The described implementations provided a technique for streaming data to a tape drive. Additionally, the above described logic may be used with other input/output (I/O) devices or other storage devices, e.g., optical disks, etc., to allow for continued streaming of data from the host to the I/O device and, at the same time, allow the host to internally determine the data that has been successfully outputted by the I/O device, e.g., stored, printed, displayed, etc.

In the described implementations, the tape drive 8 destages data from cache 16 on a FIFO basis. In alternative implementations, different techniques may be used to determine which data to destage from cache 16, e.g., LIFO, or based on some priority or alternative selection criteria. In such alternative implementations, the storage manager 4 would have to use a technique for determining the transferred data that must have been destaged based on the cache management technique used by the tape drive.

In the described implementations, the storage manager 4 determined transmitted data to commit in response to receiving the GOOD status message from the tape drive 10 indicating that data was destaged from the cache 16 to the tape 10. In alternative implementations, the storage manager 4 may indicate transmitted data as committed based solely on the amount of uncommitted written data without waiting for the GOOD status messages with the special "synch" code from the tape drive 10. In this way, the storage manager 4 continues to indicate write data as committed to tape as long as an error message is not received from the tape drive. In such case, the process in FIG. 4 would begin at block 102 and ends where error message received.

The preferred logic of FIGS. 2–6 described specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.**

**TIVOLI is a registered trademark of Tivoli Systems, Inc. IBM is a registered trademark of International Business Machines Corporation.

What is claimed is:

1. A method for maintaining status information on data transmitted to an input/output (I/O) device, wherein the I/O device stores the transmitted data in a computer readable medium memory, comprising:

transmitting data to the I/O device;

determining whether an amount of uncommited transmitted data transmitted to the I/O device not indicated as successfully completed exceeds a threshold by a fixed amount of data; and indicating that uncommitted transmitted data equivalent to the fixed amount was successfully outputted from the computer readable medium after determining that the amount of uncommited transmitted data exceeds the threshold by the fixed amount of data.

2. The method of claim 1, wherein the threshold comprises a computer readable medium capacity.

3. The method of claim 1, wherein the I/O device sends a notification upon successfully outputting data from the computer readable medium, and wherein the indication that data was successfully outputted from the computer readable medium occurs with respect to uncommitted transmitted data for which notification was not received from the I/O device indicating that the data was successfully outputted.

4. The method of claim 1, further comprising:

after determining that the fixed amount of data exceeding the threshold was transmitted, determining transmitted data equivalent to the fixed amount that is not indicated as successfully outputted in a received notification and that was sent before other transmitted data not indicated as successfully outputted, wherein the determined transmitted data comprises the fixed amount of transmitted data that is indicated as successfully outputted.

5. The method of claim 4, wherein determining the transmitted data comprises:

maintaining a queue of entries, wherein each entry is associated with a transmission of data to the I/O device, and wherein the entries are ordered according to a time the associated data was transmitted to the I/O device; and selecting entries associated with earliest transmitted data, wherein the transmitted data associated with the selected entries comprises the fixed amount of data.

6. The method of claim 1, wherein the I/O device outputs data from the computer readable medium after the computer readable medium is filled.

7. The method of claim 6, wherein the I/O device outputs data from the computer readable medium on a first-in-first-out (FIFO) basis.

8. The method of claim 1, wherein the determination of whether the fixed amount of data exceeding the Threshold was transmitted occurs after receiving a message from the I/O device indicating that data was successfully outputted from the computer readable medium.

9. The method of claim 8, wherein the data is transmitted to the I/O device with an instruction to the I/O device to transmit complete status after outputting data from the computer readable medium.

10. A method for maintaining status information on data transmitted to an input/output I/O device, wherein the I/O device stores the transmitted data in a computer readable medium memory, comprising:

transmitting data to the I/O device, wherein the I/O device compresses data before storing the transmitted data in the computer readable medium;

determining whether an amount of uncommited transmitted data not indicated as successfully completed transmitted to the I/O device exceeds a threshold multiplied by a determined compression ratio by a fixed amount of data; and indicating that uncommitted transmitted data equivalent to the fixed amount was successfully outputted from the computer readable medium after determining that the uncommitted data transmitted exceeds the threshold multiplied by the compressions ratio by the fixed amount of data.

11. The method of claim 10, further comprising:

querying the I/O device to determine a best compression ratio, wherein the determined compression ratio comprises the determined best compression ratio.

12. The method of claim 10, further comprising estimating the determined compression ratio.

13. The method of claim 12, wherein estimating the determined compression ratio comprises:

determining whether an amount of data exceeding the threshold times an estimated compression ratio was transmitted and not indicated as successfully transmitted;

determining whether the computer readable medium is full; and increasing the estimated compression ratio if the computer readable medium is not fill.

14. The method of claim 13, further comprising:

using the estimated compression ratio or the increased estimated compression ration as the determined compression ratio if the computer readable medium is determined to be full.

15. The method of claim 13, wherein the I/O device comprises a storage device in which data is sequentially stored, and wherein determining whether the computer readable medium is full comprises:

determining an initial address block in the storage device to which a next write operation will occur;

determining a current address block in the storage device to which the next write operation will occur; and determining whether the current address block differs from the initial address block, wherein the computer readable medium is full if the current address block differs from the initial address block.

16. The method of claim 1, wherein the I/O device comprises a tape drive and the computer readable medium comprises a cache, wherein outputting data comprises transferring data from the cache to a magnetic tape medium.

17. A system for maintaining status information on data transmitted to an input/output (I/O) device, wherein the I/O device stores the transmitted data in a computer readable medium, comprising:

means for transmitting data to the I/O device;

means for determining whether an amount of uncommitted transmitted data transmitted to the I/O device not indicated as successfully completed exceeds a threshold by a fixed amount of data; and means for indicating that uncommitted transmitted data equivalent to the fixed amount was successfully outputted from the computer readable medium after determining that the amount of uncommitted transmitted data exceeds the threshold by the fixed amount of data.

18. The system of claim 17, wherein the threshold comprises a computer readable medium capacity.

19. The system of claim 17, wherein the I/O device sends a notification upon successfully outputting data from the computer readable medium, and wherein the means for indicating that data was successfully outputted from the computer readable medium occurs with respect to uncommitted transmitted data for which notification was not received from the I/O device indicating that the data was successfully outputted.

20. The system of claim 19, further comprising:

means for determining, after determining that the fixed amount of data exceeding the threshold was transmitted, transmitted data equivalent to the fixed amount tat is not indicated as successfully outputted in a received notification and That was sent before other transmitted data not indicated as successfully outputted, wherein the determined transmitted data comprises the fixed amount of data that is indicated as successfully outputted.

21. The system of claim 20, wherein the means for determining the transmitted data further performs:

maintaining a queue of entries, wherein each entry is associated with a transmission of data to the I/O device, and wherein the entries are ordered according to a time the associated data was transmitted to the I/O device; and selecting entries associated with earliest transmitted data, wherein the transmitted data associated with the selected entries comprises the fixed amount of data.

22. The system of claim 17, wherein the I/O device outputs data from the computer readable medium after the computer readable medium is filled.

23. The system of claim 22, wherein the I/O device outputs data from the computer readable medium on a first-in-first-out (FIFO) basis.

24. The system of claim 17, wherein determining whether the fixed amount of data exceeding the threshold was transmitted occurs after receiving a message from the I/O device indicating that data was successfully outputted from the computer readable medium.

25. The system of claim 24, wherein the data is transmitted to the I/O device with an instruction to the I/O device to transmit complete status after outputting data from the computer readable medium.

26. A system for maintaining status information on data transmitted to an input/output (I/O) device, wherein the I/O device stores the transmitted data in a computer readable medium, comprising:

means for transmitting data to the I/O device, wherein the I/O device compresses data before storing the transmitted data in the computer readable medium;

means for determining whether an amount of uncommited transmitted data not indicated as successfully completed transmitted to the I/O device exceeds a a threshold multiplied by a determined compression ratio by a fixed amount of data; and means for indicating that uncommitted transmitted data equivalent to the fixed amount was successfully outputted from the computer readable medium after determining that the uncommitted data transmitted exceeds the threshold multiplied the compression ratio by the fixed amount of data.

27. The system of claim 26, further comprising:

means for querying the I/O device to determine a best compression ratio, wherein the determined compression ratio comprises the determined best compression ratio.

28. The system of claim 26, further comprising means for estimating the determined compression ratio.

29. The system of claim 28, wherein the means for estimating the determined compression ratio further performs:

determining whether an amount of data exceeding the threshold times an estimated compression ratio was transmitted;

determining whether the computer readable medium is full; and increasing the estimated compression ratio if the computer readable medium is not full.

30. The system of claim 29, further comprising:

means for using the estimated compression ratio or the increased estimated compression ration as the determined compression ratio if the computer readable medium is determined to be full.

31. The system of claim 30, wherein the I/O device comprises a storage device in which data is sequentially stored, and wherein the means for determining whether the computer readable medium is full further performs:

determining an initial address block in the storage device to which a next write operation will occur;

determining a current address black in the storage device to which the next write operation will occur; and determining whether the current address block differs from the initial address block, wherein the computer readable medium is full if the current address block differs from the initial address block.

32. The system of claim 17, wherein the I/O device comprises a tape drive and the computer readable medium comprises a cache, wherein outputting data comprises transferring data from the cache to a magnetic tape medium.

33. An article of manufacture for use in maintaining status information on data transmitted to an input/output (I/O) device, wherein the I/O device stores the transmitted data in a computer readable medium, the article of manufacture including code capable of causing a processor to perform:

transmitting data to the I/O device;

determining whether an amount of uncommited transmitted data transmitted to the I/O device not indicated as successfully completed exceeds a threshold by a fixed amount of data; and indicating that uncommitted transmitted data equivalent to the fixed amount was successfully outputted from the computer readable medium after determining that the amount of uncommited transmitted data exceeds the threshold by the fixed amount of data.

34. The article of manufacture of claim 33, wherein the threshold comprises a computer readable medium capacity.

35. The article of manufacture of claim 33, wherein the I/O device sends a notification upon success fully outputting data from the computer readable medium, and wherein the indication that data was successfully outputted from the computer readable medium occurs with respect to uncommitted transmitted data for which notification was not received from the I/O device indicating that the data was successfully outputted.

36. The article of manufacture of claim 33, further comprising:

after determining that the fixed amount of data exceeding the threshold was transmitted, determining transmitted data equivalent to the fixed amount that is not indicated as successfully outputted and that was sent before other transmitted data not indicated as successfully outputted, wherein the determined transmitted data comprises the fixed amount of transmitted data that is indicated as successfully outputted.

37. The article of manufacture of claim 36, wherein determining the transmitted data comprises:

maintaining a queue of entries, wherein each entry is associated with a transmission of data to the I/O device, and wherein the entries are ordered according to a time the associated data was transmitted to the I/O device; and selecting entries associated with earliest transmitted data, wherein the transmitted data associated with the selected entries comprises the fixed amount of data.

38. The article of manufacture of claim 33, wherein the I/O device outputs data from the computer readable medium after the computer readable medium is filled.

39. The article of manufacture of claim 38, wherein the I/O device outputs data from the computer readable medium on a first-in-first-out (FIFO) basis.

40. The article of manufacture of claim 33, wherein the determination of whether the fixed amount of data exceeding the threshold was transmitted occurs after receiving a message front the I/O device indicating that data was successfully outputted from the computer readable medium.

41. The article of manufacture of claim 40, wherein the data is transmitted to I/O device with an instruction to the I/O device to transmit complete status after outputting data from the computer readable medium.

42. An article of manufacture for use in maintaining status information on data transmitted to an input/output (I/O) device, wherein the I/O device stores the transmitted data in a computer readable medium, the article of manufacture including code capable of causing a processor to perform:
  transmitting data to the I/O device, wherein the I/O device compresses data before storing the transmitted data in the computer readable medium;
  determining whether an amount of uncommited transmitted data not indicated as successfully completed transmitted to the I/O device exceeds a threshold multiplied by a determined compression ratio by a fixed amount of data; and
  indicating that uncommitted transmitted data equivalent to the fixed amount was successfully outputted from the computer readable medium after determining that the uncommitted data transmitted exceeds the threshold multiplied by the compression ratio by the fixed amount of data.

43. The article of manufacture of claim 42, wherein the code is further capable of causing the processor to perform:
  querying the I/O device to determine a best compression ratio, wherein the determined compression ratio comprises the determined best compression ratio.

44. The article of manufacture of claim 42, wherein the instruction is further capable of causing the processor to perform estimating the determined compression ratio.

45. The article of manufacture of claim 44, wherein estimating the determined compression ratio comprises:
  determining whether an amount of data exceeding the threshold times an estimated compression ratio was transmitted and not indicated as successfully transmitted;
  determining whether the computer readable medium is full; and
  increasing the estimated compression ratio if the computer readable medium is not full.

46. The article of manufacture of claim 45, wherein the code is further capable of causing the processor to perform:
  using the estimated compression ratio or the increased estimated compression ration as the determined compression ratio if the computer readable medium is determined to be full.

47. The article of manufacture of claim 45, wherein the I/O device comprises a storage device in which data is sequentially stored, and wherein determining whether the computer readable medium is full comprises:
  determining an initial address block in the storage device to which a next write operation will occur;
  determining a current address block in the storage device to which the next write operation will occur; and
  determining whether the current address block differs from the initial address block, wherein the computer readable medium is full if the current address block differs from the initial address block.

48. The article of manufacture of claim 33, wherein the I/O device comprises a tape drive, wherein the computer readable medium comprises a cache, and wherein outputting data comprises transferring data from the cache to a magnetic tape medium.

* * * * *